US011088847B2

(12) United States Patent
Matsugashita et al.

(10) Patent No.: US 11,088,847 B2
(45) Date of Patent: Aug. 10, 2021

(54) AUTHORITY TRANSFER SYSTEM, CONTROL METHOD THEREFOR, AND STORAGE MEDIUM

(71) Applicant: CANON KABUSHIKI KAISHA, Tokyo (JP)

(72) Inventors: Hayato Matsugashita, Kawasaki (JP); Kazunari Yamanakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/114,048

(22) Filed: Aug. 27, 2018

(65) Prior Publication Data
US 2019/0068377 A1 Feb. 28, 2019

(30) Foreign Application Priority Data

Aug. 31, 2017 (JP) .............................. JP2017-167285

(51) Int. Cl.
H04L 9/32 (2006.01)
H04L 9/30 (2006.01)
H04L 29/06 (2006.01)
H04L 29/12 (2006.01)
H04L 29/08 (2006.01)

(52) U.S. Cl.
CPC .............. *H04L 9/3247* (2013.01); *H04L 9/30* (2013.01); *H04L 63/062* (2013.01); *H04L 63/0807* (2013.01); *H04L 63/0815* (2013.01); *H04L 63/102* (2013.01); *H04L 67/02* (2013.01); *H04L 67/42* (2013.01); *H04L 61/2007* (2013.01)

(58) Field of Classification Search
CPC ....... H04L 9/3247; H04L 9/30; H04L 63/062; H04L 63/0807; H04L 63/0815; H04L 63/102; H04L 67/02; H04L 67/42; H04L 61/2007
See application file for complete search history.

(56) References Cited

U.S. PATENT DOCUMENTS 6,961,783 B1 11/2005 Jeffrey et al.
7,889,379 B2 * 2/2011 Okayama ........... H04N 1/00498
358/1.16

(Continued)

FOREIGN PATENT DOCUMENTS

CN 101536438 A 9/2009
CN 103795692 A 5/2014
(Continued)

OTHER PUBLICATIONS

JP-2016085638-A English Translation (Year: 2016).*
(Continued)

*Primary Examiner* — Daniel B Potratz
*Assistant Examiner* — Wansik You
(74) *Attorney, Agent, or Firm* — Canon U.S.A., Inc. IP Division

(57) ABSTRACT

An authority transfer system includes a transmitting unit configured to transmit an authorization code request from a client to an authorization server and a receiving unit configured to receive an authorization code response, and a responding unit configured to return, by the authorization server, the authorization code response based on the destination information included in the authorization code request.

11 Claims, 9 Drawing Sheets

(56) References Cited

U.S. PATENT DOCUMENTS

| | | | |
|---|---|---|---|
| 2004/0210663 A1* | 10/2004 | Phillips | H04L 67/1014 |
| | | | 709/230 |
| 2010/0257102 A1* | 10/2010 | Perlman | G06Q 20/401 |
| | | | 705/75 |
| 2014/0007198 A1 | 1/2014 | Durbha | |
| 2015/0350179 A1 | 12/2015 | Makoto | |
| 2016/0080157 A1* | 3/2016 | Lundstrom | H04L 9/3247 |
| | | | 713/176 |
| 2016/0239840 A1* | 8/2016 | Preibisch | G06Q 20/3829 |
| 2017/0171201 A1 | 6/2017 | Matsugashita | |

FOREIGN PATENT DOCUMENTS

| | | | |
|---|---|---|---|
| JP | 2016-6624 A | | 1/2016 |
| JP | 2016085638 A | * | 5/2016 |

OTHER PUBLICATIONS

D. Hardt, Ed., The OAuth 2.0 Authorization Framework, Internet Engineering Task Force (IETF), Oct. 2012.

M. Jones, et al., OAuth 2.0 Token Exchange, OAuth Working Group (IETF), Jul. 3, 2017.

Michael B Jones, et al., The OAuth 2.0 Authorization Framework: Bearer Token Usage, Internet Engineering Task Force (IETF), Requests for Comments: 6750, Standards Track, Oct. 2012, 18 pages.

* cited by examiner

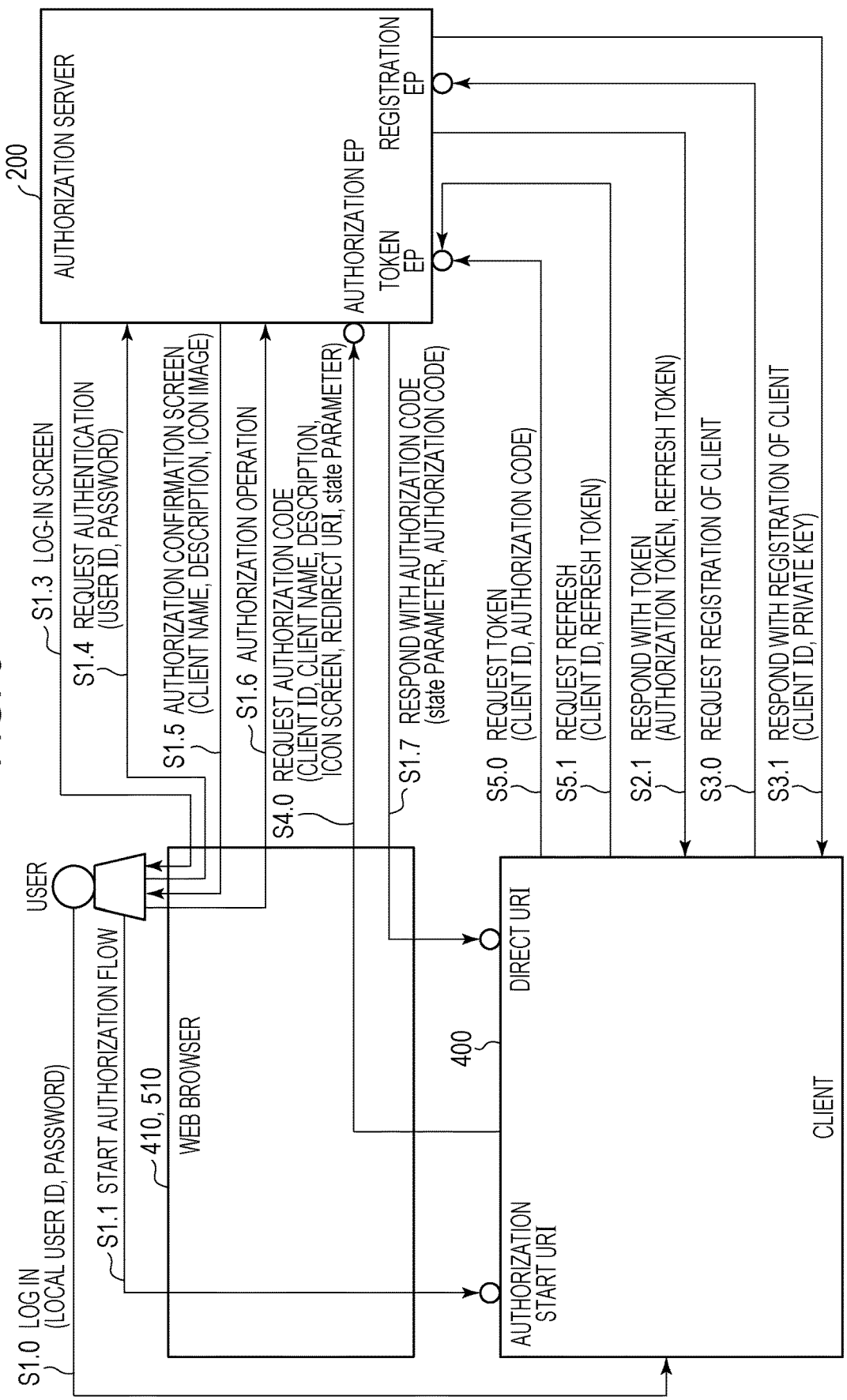

FIG. 7

EXAMPLE OF JSON WEB TOKEN (JWT) OF AUTHORIZATION REQUEST

Header
{
  "alg": "RS256",
  "typ": "JWT"
}

Payload
{
  "iss": "client_01",
  "sub": "client_01",
  "aud": "https://xxx.com/authrization",
  "exp": 1472710413,
  "iat": 1472700413,
  "client_name": "DEVICE XX",
  "description": "DEVICE XX\r\nLOCATED IN YY.",
  "icon_image": "data:image/png;base64,iVBORw0KGgoAAAANSUhEUgAAADIAAABVCAIAAACErCAEAAAAXNSR0IArs4c6QAAAARnQU1BAACxjwv8YQUAAAAJcEhZcwAADsMAAA7DAcdvqGQAAAPqSURBVGhD7ZrbS+NAFIfznwv2oY+VQDDEguIKgiA+BlkL⋯(base64 encoded data)",
  "redirect_uri": "https://192.168.1.1/redirect"
}

Encoded
eyJhbGciOiJSUzI1NiIsInR5cCI6IkpXVCJ9⋯(base64 encoded header).eyJpc3MiOiJjbGllbnQwMDEiLCJzdWIiOiJodHRwczovL3h4eC5jb20vIiwiYXVkIjoiaHR0cHM6Ly94eHguY29tL2F1dGhyaXphdGlvbiIsImV4cCI6MTQ3MjcxMDQxMywiaWF0IjoxNDcyNzAwNDEzfQ⋯(base64 encoded payload).k_SbabNV⋯(Signature)

FIG. 8

EXAMPLE OF JSON WEB TOKEN (JWT) OF TOKEN REQUEST

Header
{
  "alg": "RS256",
  "typ": "JWT"
}

Payload
{
  "iss": "client_01",
  "sub": "client_01",
  "aud": "https://xxx.com/token",
  "exp": 1472710413,
  "iat": 1472700413
}

Encoded
eyJhbGciOiJSUzI1NiIsInR5c⋯(base64 encoded header).eyJpc3MiOiJjbGllbnQwMDEiLCJzdWIiOiJjbGllbnQwMDEiLCJhd WQiOiJodHRwczovL3h4eC5jb20vdG9rZW4iLCJleHAiOjE0NzI3MTA0MT MsImlhdCI6MTQ3Mjc⋯(base64 encode payload).IBFA00uTUAchvRyXWMICqv5P⋯(Signature)

AUTHORITY TRANSFER SYSTEM, CONTROL METHOD THEREFOR, AND STORAGE MEDIUM

BACKGROUND OF THE INVENTION

Field of the Invention

The present disclosure relates to an authority transfer system which verifies an access authority to a web service, a control method therefor, and a storage medium.

Description of the Related Art

An individual web server provides an open API for providing a web service, and web services can cooperate with each other via the open API. From a viewpoint of security in this case, a measure may be required for authorizing an access to one web service by another web service without handing over authentication information of a user managed by the one web service.

In order to achieve such a measure, a standard protocol (OAuth 2.0) has been adopted to implement a cooperation between web services. OAuth 2.0 is a mechanism for safely handing over (or transferring) authentication information of a user between web services with approval of the user, details of which will be described below.

According to OAuth 2.0, when a user performs an authorization operation, a web service B receives an authorization code. The authorization code is a code for certifying that the access to a web service A is authorized by the user. By using the received authorization code and information certifying the web service B, the web service B transmits a request to issue an authorization token to the web service A. The authorization token is a token for authorizing the web service B to access an open API provided by the web service A. The web service B receives the authorization token and thus the web service B is authorized to access the API of the web service A. The information for certifying the web service B may be an ID uniquely identifying the web service B, a secret that is confidential information, or a digital signature with a digital certificate.

Here, a term "authority transfer" refers to authorizing, by an authorization operation performed by a user, an access by the web service B to an API of the web service A. In OAuth 2.0, a server configured to issue an authorization code in response to an authorization operation performed by a user and to issue an authorization token from the authorization code is referred to as an authorization server. A server configured to provide an open API is referred to as a resource server, and an entity which accesses the open API is referred to as a client. In the example above, the server which provides the web service A corresponds to the authorization server and the resource server, and the server which provides the web service B corresponds to the client.

With reference to FIG. 1, Authorization Code Grant that is a processing flow according to OAuth 2.0 will be described. First, as a prior operation for implementing OAuth 2.0, a registration request is transmitted to the authorization server so that a client is registered as an OAuth 2.0 client (S0.0). More specifically, the client registration request is transmitted to a registration end point ("EP" in FIG. 1) of the authorization server upon start-up of the client or if the client is not registered at the beginning of the authorization flow in S1.1, which will be described below. The transmission of the registration request may be performed by a client actively communicating with the authorization server or by a user accessing the authorization server via a web browser and registering the client, for example.

The registration request in S0.0 includes a client name, a description, an icon image, and a redirect URI that is a required parameter, which are displayed on an authorization confirmation screen described below. The redirect URI is response destination information (address) designating a response destination to which the authorization server transmits an authorization code response in order that the client receives the authorization code response from the authorization server. The authorization code response will be described below. The authorization server having received the client registration request issues a client ID identifying a client and a client secret that is confidential information for authenticating the client and returns the client ID and client secret to the client as a client registration response (S0.1). The authorization server holds the client ID and client secret received in S0.1 and the information and redirect URI received in S0.0 in association with each other. The client holds the client ID and client secret received in S0.1. Up to this point, the client registration flow that is the prior operation for implementing OAuth 2.0 has been described.

Next, a flow for authenticating a user in the authorization server will be described with reference to FIG. 1. The user may log in the client (S1.0). The client generates and holds a log-in context that is information identifying the log-in user. Information (such as a local user ID) identifying the log-in user can be obtained from the generated log-in context. The user may access a URI for starting an authorization (hereinafter, authorization start URI) via a web browser and may start an authorization flow according to OAuth 2.0 (S1.1). In response to the access to the authorization start URI for starting the authorization flow, the client transmits an authorization code request to an authorization end point of the authorization server (S1.2). The authorization code request includes a client ID, a redirect URI, and a state parameter.

The state parameter is information for uniquely associating the authorization code request with the authorization code response and is usable for preventing a CSRF (cross-site request forgery) attack and a token replacement (hereinafter, "authorization code replacement") attack. For that purpose, the state parameter is an unpredictable and non-overlapping value. A match between the state parameter received by the client in the authorization code response, which will be described below, and the state parameter transmitted by the client in the authorization code request in S1.2 is verified. Further, in order to identify the user who has executed the authorization code request, the state parameter issued by the client is managed by the client in association with the redirect URI and the log-in context.

If the user has not logged in the authorization server, the authorization server having received the authorization code request in S1.2 responds with a log-in screen for authenticating the user on the web browser (S1.3). The user may input a user ID and a password via the web browser and execute an authentication request to the authorization server (S1.4). The authorization server having received the authentication request verifies a match between a combination of the user ID and password received in S1.4 and a pre-registered combination. If the combination of the user ID and password received in S1.4 matches the pre-registered combination, the authorization server issues an authorization token. The issued authorization token is responded to a Cookie of the web browser.

The authorization server responds with an authorization confirmation screen for a user to approve the authorization of the client on the web browser (S1.5). If the combination of the client ID and redirect URI received in S1.2 does not match the combination of the client ID and redirect URI pre-registered in the authorization server, the authorization server responds with an error screen on the web browser. This can prevent redirect (transfer) to an invalid URI. In a case where the log-in user has already executed the authorization operation by using the identical client ID, the processing in S1.5 can be omitted. Hereinafter, a combination of the authorized user ID and client ID will be referred to as approval information.

After the authorization operation is performed by the user in S1.6, the authorization server issues the authorization code and transmits the authorization code and the state parameter as an authorization code response to the client (S1.7). More specifically, the authorization code and the state parameter are added as a query parameter to the redirect URI, which is then transmitted to the web browser such that the authorization code and the state parameter are to be redirected to the response destination designated by the redirect URI. The authorization code issued in S1.7 is saved in association with the client ID, the user ID, and the redirect URL in the authorization server. The authorization server further saves the approval information.

The client having received the authorization code response for the redirect URI verifies whether the state parameter included in the authorization code response matches the state parameter managed by the client. If the state parameters match as a result of the verification, the client transmits a token request to a token end point of the authorization server (S2.0). The token request includes the client ID, the client secret, the authorization code obtained in S1.7, and the redirect URI received in S1.2.

The authorization server having received the token request in S2.0 verifies whether the combination of the client ID and the client secret matches the pre-registered combination. If it is determined as a result of the verification that they match, the client is authorized. The authorization server verifies whether it holds the authorization code having received in S2.0, and, if so, verifies whether the authorization code has not expired and whether the client ID and redirect URI in association with the authorization token match those received in the token request in S2.0. Through this verification, the authorization server can verify whether the client having transmitted the authorization code request in S1.2 matches the client having transmitted the token request in S2.0.

If the verification succeeds, the authorization server issues an authorization token to the client and responds with it as a token response to the client (S2.1). Here, the authorization server can issue to the client a refresh token for obtaining the authorization token again and responds with it as the token response. The client can access the open API provided by the resource server by using the authorization token received in S2.1. After issuing the authorization token, an authorization code managed by the authorization server can be discarded for prevention of a replay attack.

If the refresh token is included in the token response in S2.1, the log-in context and the refresh token are managed in association with each other in the client. Thus, the authorization token can be obtained again without performing the authorization operation (S1.2 to S1.7) for accessing the API on the next and subsequent occasions. More specifically, in response to a start of an authorization in S1.1, the client checks whether the log-in context of the user and the refresh token are associated with each other. If not, the flow according to OAuth 2.0 (processing in S1.2 and subsequent steps) is performed. If the log-in context of the user and the refresh token are associated with each other, a refresh request is transmitted to the token end point of the authorization server (S2.2). The refresh request includes the client ID, the client secret, and the refresh token.

The authorization server having received the refresh request verifies whether the combination of the client ID and the client secret matches the combination pre-registered in S0.1. If the match is confirmed and the client is authorized, authorization server verifies whether the received refresh token is held by the authorization server, and, if so, verifies whether the refresh token has not expired and whether the client ID in association with the refresh token matches the client ID in the refresh request. If these verifications are all succeeded, the authorization server issues an authorization token and transmits the authorization token as a token response to the client. Here, a new refresh token may be re-issued for obtaining the authorization token again and may be transmitted to the client simultaneously with the token response. After the new refresh token is issued in the authorization server, the authorization server discards, for prevention of a replay attack, the refresh token having been managed. The processing flow for Authorization Code Grant according to OAuth 2.0 has been described. The processing flow according to OAuth 2.0 enables the authorization server to issue an authorization token and the client to access an open API provided by the resource server by using the issued authorization token, instead of transmission of user's authentication information managed by the authorization server to the client. Japanese Patent Laid-Open No. 2016-6624 discloses an information processing system that cooperates with a plurality of external service systems by using the processing flow according to OAuth 2.0.

SUMMARY OF THE INVENTION

The present disclosure has the following configuration. That is, an authority transfer system includes a client, user agent, a resource server, and an authorization server for authorizing the client to access the resource server. The authority transfer system includes a processor and a memory coupled to the processor and having stored thereon instructions, which when executed by the processor, and cooperating to act as a transmitting unit configured to transmit, from a client to an authorization server via a user agent, an authorization code request for authorization by the authorization server for access to a resource server by the client, a receiving unit configured to receive an authorization code response, the authorization code response being a response to the authorization code request. The authorization code request includes response destination information for designating a response destination to which the authorization server is to return the authorization code response and signature information added to the response destination information from the authorization server. By the authorization server, the authorization code response is returned to the authorization code request based on the response destination information included in the authorization code request transmitted by the transmitting unit.

Further features of the present invention will become apparent from the following description of embodiments with reference to the attached drawings.

BRIEF DESCRIPTION OF THE DRAWINGS

FIG. 6 illustrates a processing flow of Authorization Code Grant based on OAuth 2.0 according to the embodiment.

FIG. 7 illustrates an example of a JWT including an authorization code request according to the embodiment.

FIG. 8 illustrates an example of a JWT including an authorization token according to the embodiment.

DESCRIPTION OF THE EMBODIMENTS

Figure 1:
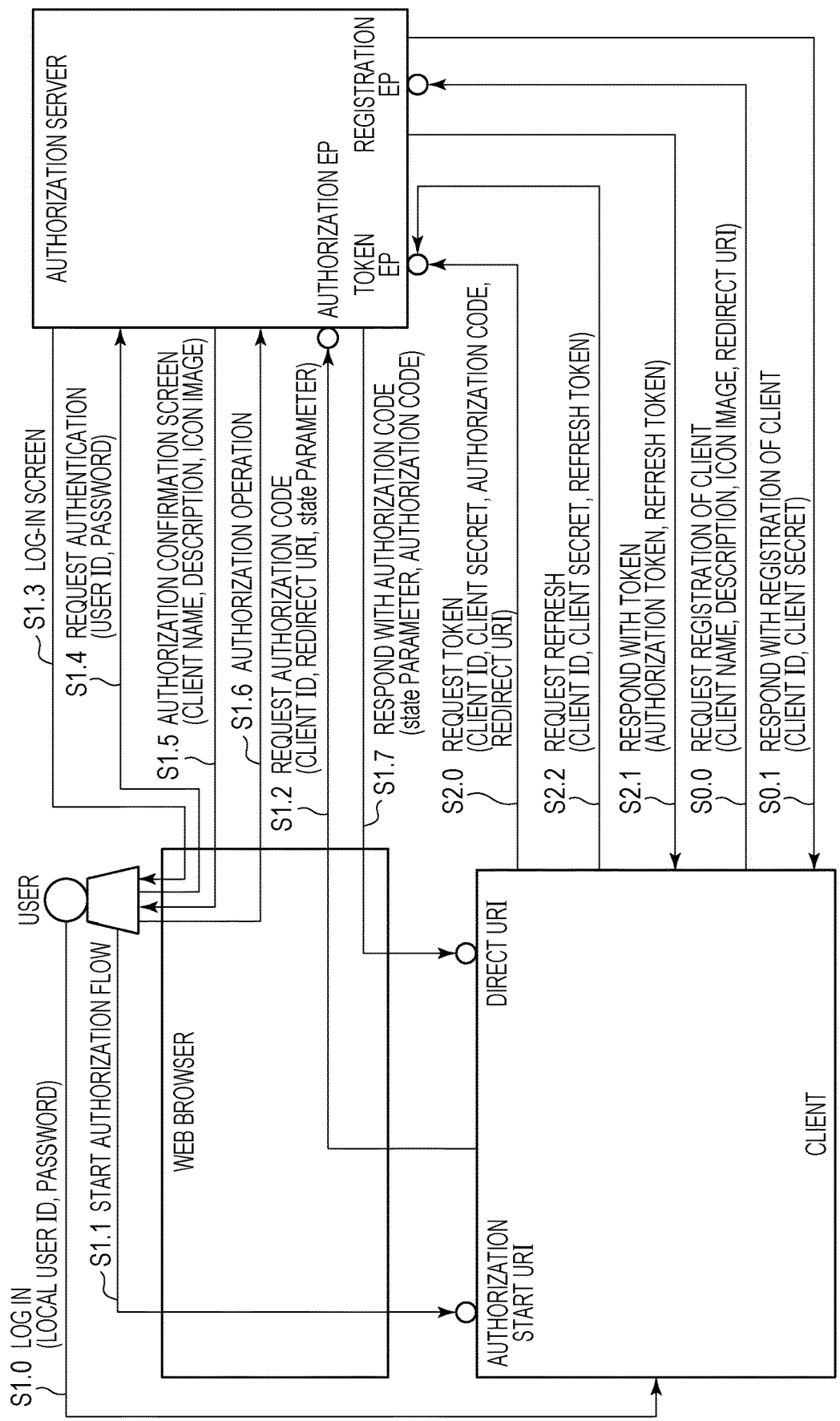
FIG. 1 is a processing flow of Authorization Code Grant based on OAuth 2.0.

In the processing flow illustrated in FIG. 1, changing a URI of a client may require a change of a redirect URI thereto registered with an authorization server. Therefore, every time a URI of a client is changed, a request to change the redirect URI is to be transmitted to the authorization server, which takes time and labor. As an example that requires changing a URI of a client, a host for the URI may be changed due to a change of the location of a client in a case where the client is a device such as a printer or an MFP. As another example, switching ON/OFF of the power supply to a device may change an IP address of the device, which results in a change of the host for the URI, in a case where the IP address of the device is automatically determined based on a protocol such as DHCP. The present disclosure can resolve the complexity of processing based on OAuth 2.0 in a case where a URI of a client is changed, without impairing security in execution of the processing.

With reference to drawings, the best modes for embodying the present disclosure will be described below.

Figure 2:
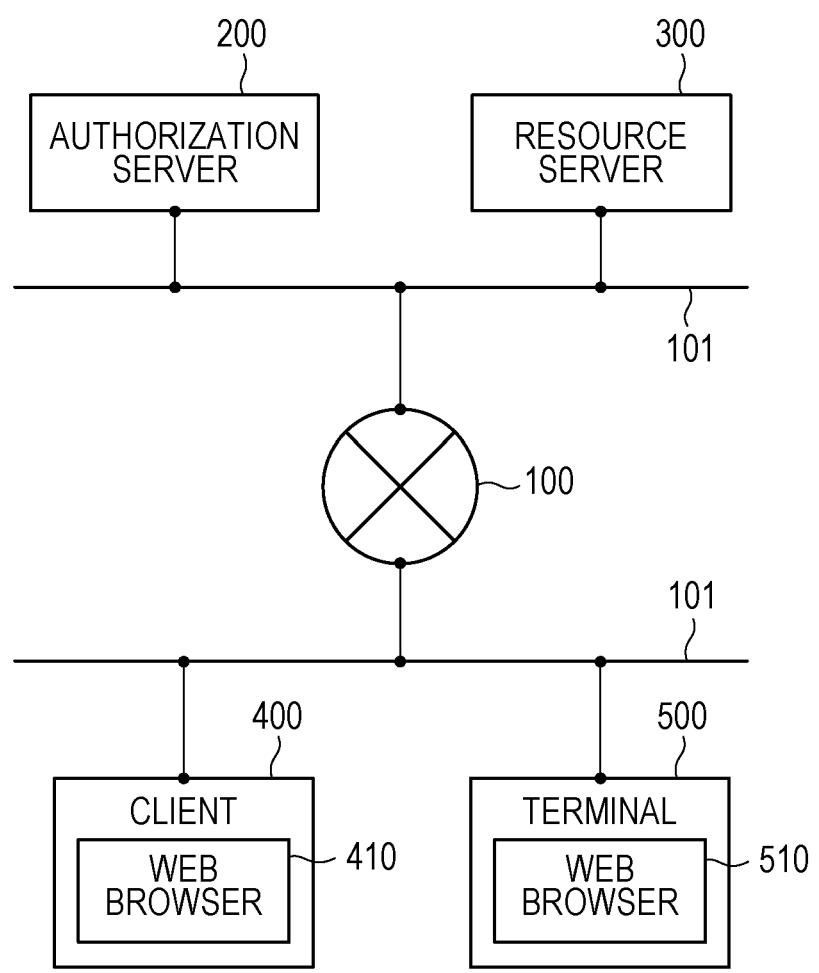
FIG. 2 is a configuration diagram illustrating an authority transfer system according to an embodiment.

First, an authority transfer system according to an embodiment of the present disclosure will be described with reference to FIG. 2. A Wide Area Network (WAN) 100 is constructed by a World Wide web (WWW) system. The WAN 100 and devices 200 to 500 are connected over a Local Area Network (LAN) 101.

An authorization server 200 is a server for implementing OAuth 2.0 and is configured to perform processing such as receiving an authentication request and issuing and managing authorization codes. A resource server 300 has an open API for providing a web service. Although the authorization server 200 and the resource server 300 are connected over the LAN 101 in FIG. 2, they can be connected over the WAN 100. The authorization server 200 can further be connected to a database server, not illustrated, over the LAN 101 such that data to be used by the authorization server 200 for implementing its function or functions can be stored in the database server. Although the authorization server 200 and the resource server 300 are provided as separate servers in FIG. 2, the functionalities of the servers can be implemented in one server.

A client 400 corresponds to a client based on OAuth 2.0 and may be a printer, an MFP, a PC or a smart phone, for example. A terminal 500 corresponds to a user agent based on OAuth 2.0. A user can use, via the terminal 500, functions of the devices such as a user authentication request to the authorization server 200 and a log-in operation to be performed on the client 400. The terminal 500 may specifically be a PC or a smart phone, for example.

The client 400 and the terminal 500 include a web browser 410 and a web browser 510, respectively. A user may operate the web browser 410 or the web browser 510 to execute an authorization operation, which will be described below. The client 400 and the terminal 500 are connected over the LAN 101. Hereinafter, the web browser 410 and the web browser 510 will be simply referred to as a "web browser" without the reference numerals if an operation can be performed by either one of them.

Figure 3:
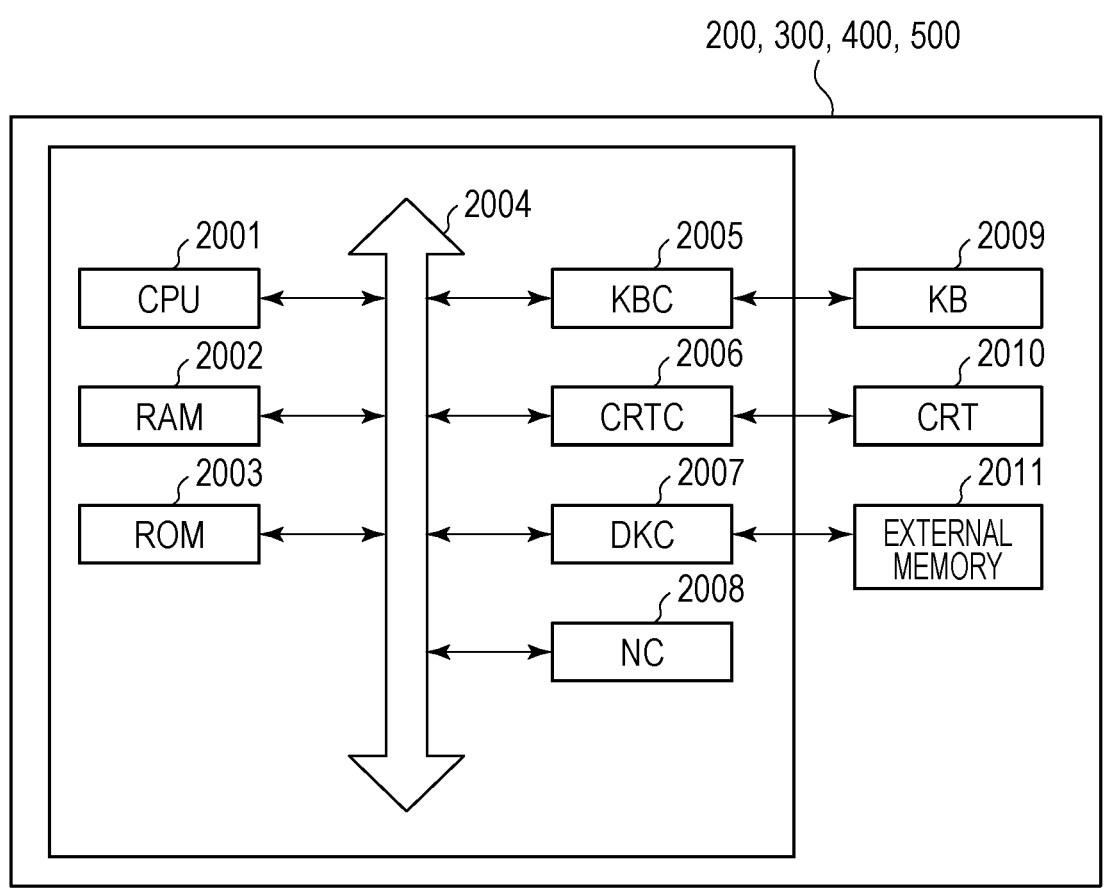
FIG. 3 illustrates a hardware configuration of devices included in the authority transfer system.
Figure 4A:
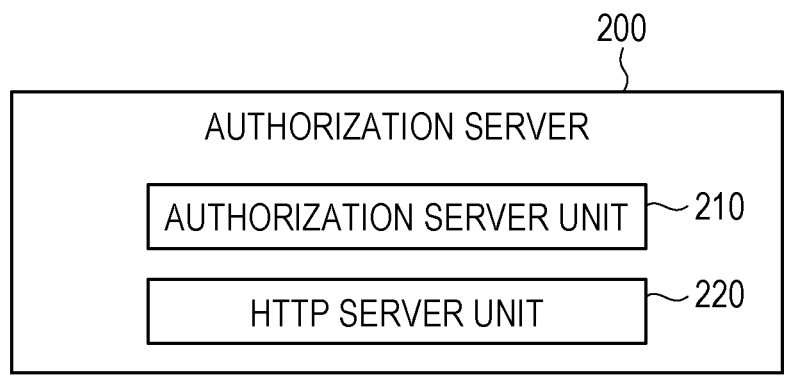
FIGS. 4A to 4D illustrate a software module configuration of devices included in the authority transfer system.
Figure 4B:
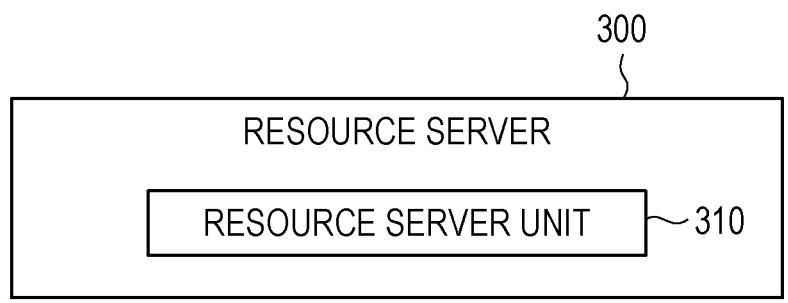
Figure 4C:
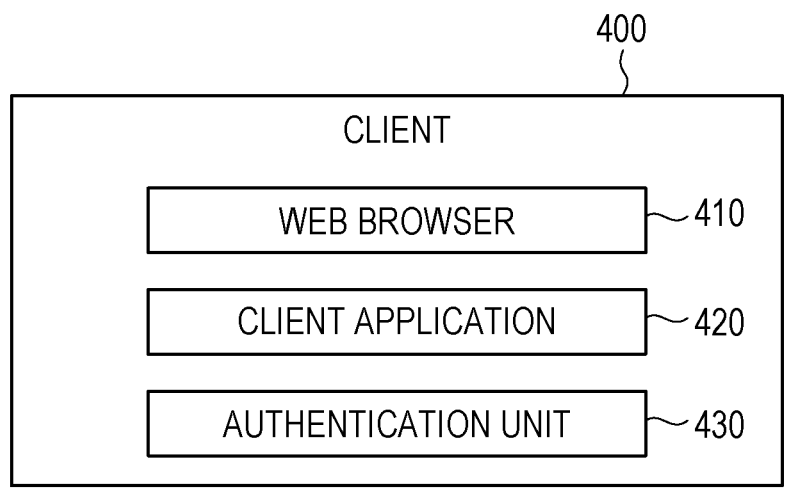
Figure 4D:
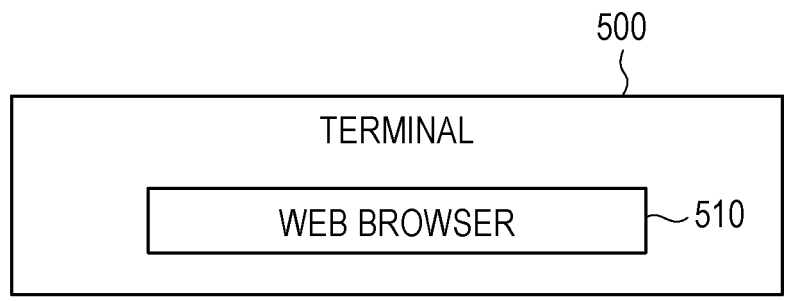

Next, with reference to FIG. 3, a hardware configuration of the authorization server 200, the resource server 300, the client 400, and the terminal 500 will be described. FIG. 3 is a block diagram illustrating a general information processing apparatus, the devices according to this embodiment can apply a hardware configuration of a general information processing apparatus or a virtual hardware configuration of an information processing apparatus that is provided as an Infrastructure as a Service (IaaS). The client 400 will be described as an example with reference to FIG. 3, but the resource server 300, the authorization server 200, and the terminal 500 all have the same hardware configuration.

A CPU 2001 is configured to read out a program from a RAM 2002, a ROM 2003, an external memory 2011, or the like and execute instructions of the program for control over the client 400. A sequence which will be described below can be implemented by executed instructions of such a program. The CPU 2001 is further configured to control blocks connected to a system bus 2004.

The RAM 2002 is a work memory usable by the CPU 2001 to execute instructions. A program such as an OS or an application saved in the ROM 2003 or the external memory 2011 may be loaded to the RAM 2002, and the CPU 2001 may sequentially read out and execute instructions of the program. The ROM 2003 is a storage device configured to store an embedded program and data including an application program and an OS.

A keyboard controller (KBC) 2005 is configured to control inputs from a keyboard (KB) 2009 and a pointing device, not illustrated. A cathode ray Tube Controller (CRTC) 2006 is configured to control display presented by a CRT display 2010. A disk controller (DKC) 2007 is configured to control data accesses to the external memory 2011. A network controller (NC) 2008 is configured to execute processing for controlling communications with the other devices connected to the device over the WAN 100 or the LAN 101. If the device is a virtual information processing apparatus provided as an IaaS, the device may not have the KBC 2005 and the CRTC 2006 but may be operated through a keyboard or a CRT display included in a terminal connected to the device via the NC 2008.

In the following descriptions, functions of the devices may be executed mainly by the CPU 2001 in hardware or mainly by a program installed in the RAM 2002, the ROM 2003, the external memory 2011 or the like in software, unless otherwise specified.

Next, with reference to FIGS. 4A to 4D, functions of the authorization server 200, the resource server 300, the client 400, and the terminal 500 will be described. The authorization server 200 has an authorization server unit 210 and an HTTP server unit 220. The HTTP server unit 220 is connected to the client 400 and the terminal 500 over the WAN 100 and is a function configured to perform HTTP communication with a web browser or a client application 420 which will be described below. The HTTP server unit 220 can perform communication based on SSL/TLS and has a certification store, not illustrated.

The authorization server unit 210 is a function configured to receive a request from a web browser 510 via the HTTP server unit 220 and responds with a result to the received request. More specifically, the HTTP server unit 220 is configured to receive a user authentication request from the web browser 510, generate an authorization token associated with user information on a user who have been successfully authenticated, and notify the authorization token to the web browser 510. The authorization token here may be a token indicating that a user is logging in the authorization server 200 or a token for verifying whether a user has been authenticated by the authorization server 200. Use of the authorization token enables the authorization server 200 to identify a user. An authorization code, on the other hand, is a token indicating that the client 400 to which authority is transferred through an authorization operation performed by an authenticated user is permitted to access an API of the resource server 300 on behalf of the user. The authorization server unit 210 can be further configured to hold a private key for adding signature information to authorization token. In this case, the private key may be used to add the signature information to the authorization token, and the authorization token with the signature information may be issued to the client 400.

The resource server 300 has a resource server unit 310. The resource server unit 310 is a function configured to provide an open API for providing a web service. The resource server unit 310 may have an HTTP server unit and may be configured to perform transmission and reception to and from an external device via the HTTP server unit, like the authorization server 200.

The client 400 has a web browser 410, a client application 420, and an authentication unit 430. The web browser 410 is a function to be implemented by a user agent for using the WWW, which is the same as the function of the web browser 510 included in the terminal 500. The web browser 410 is configured to communicate with the authorization server 200 and the client application 420 in response to a user operation. The client application 420 is configured to execute the open API provided by the resource server 300 to provide a user with a web service in combination with a function provided by the client application 420. According to this embodiment, the client application 420 corresponds to a client based on OAuth 2.0.

The authentication unit 430 is a function for authenticating a user. A user may input a local user ID and a local user password through an input screen, not illustrated, presented by the client 400 to use a function of the client 400. The client 400 in response to the input performs authentication processing on the user by comparing between information (local user ID and local user password) pre-registered in the authentication unit 430 and the input information and generates a log-in context. The authentication processing may be performed in any other forms such as an authentication with an IC card or a biometric authentication based on a fingerprint.

The log-in context is information for identifying a local user in the client 400 and may include a local user ID, for example. The log-in context is shared by the client application 420 and the authentication unit 430. Having described that, according to this embodiment, the processing for logging in the client 400 is executed by directly operating the client 400, a user may log in the client 400 remotely via the web browser 510. In this case, the authentication unit 430 responds with a log-in screen, not illustrated, to the web browser 510. The user is authenticated based on a local user ID and a local user password input by the user through the log-in screen. In this case, a log-in context is generated in the authentication unit 430 and is shared by the client application 420 and the authentication unit 430.

Embodiment 1

According to Embodiment 1, the complexity of processing based on OAuth 2.0 due to a change of a URI of a client can be resolved without impairing security in execution of the processing. Like numbers refer to like processing flows described in FIG. 1 and this embodiment, and repetitive detail descriptions thereof will be omitted.

Figure 5A:
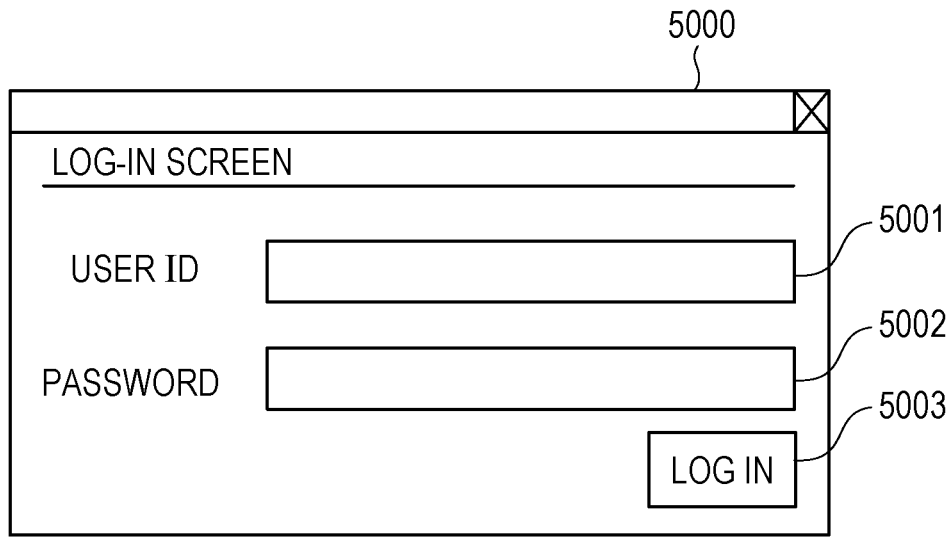
FIGS. 5A and 5B illustrate examples of a user authentication screen and an authorization confirmation screen for a client to be displayed by a web browser.
Figure 5B:
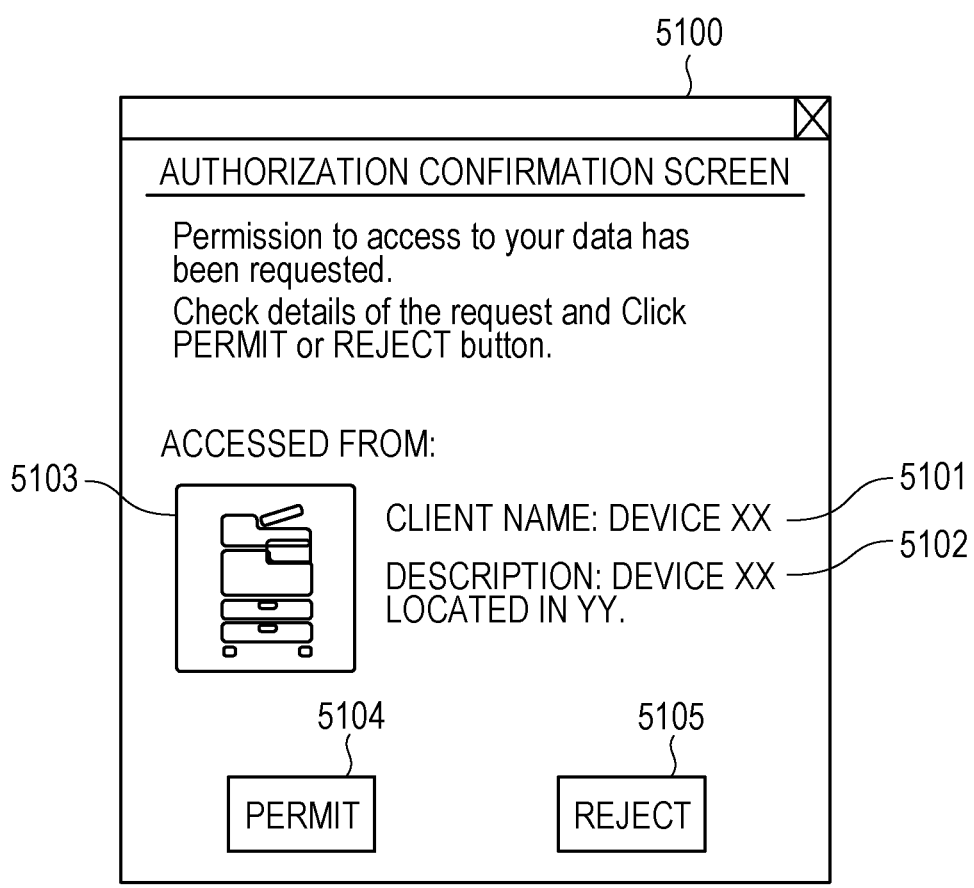

First, with reference to FIGS. 5A and 5B, a log-in screen for authenticating a user by the authorization server 200 and an authorization confirmation screen for inquiring a user about approval about authorization of the client 400.

FIG. 5A illustrates an example of a log-in screen displayed on a web browser and usable by a user for logging in the authorization server 200. The log-in screen is to be displayed on the web browser in a case where a user transmits an authorization code request to an authorization end point of the authorization server 200 via the web browser and the user has not logged in the authorization server 200. A log-in screen 5000 includes a user ID input field 5001, a password input field 5002, and a LOG IN button 5003 usable for executing a log-in operation. Processing to be performed after the LOG IN button 5003 is pressed will be described below.

FIG. 5B illustrates an example of an authorization confirmation screen with which the authorization server 200 responds to the web browser as a result of authentication of a user. The authorization confirmation screen 5100 has a content for inquiring a user about the approval, including a client name 5101 of the client 400 to be authorized and a description 5102 regarding the client 400, and an icon image 5103. The authorization confirmation screen 5100 further includes a PERMIT button 5104 and a REJECT button 5105 usable by a user for authorizing and rejecting the authorization of the client 400, respectively. Processing to be performed when the PERMIT button 5104 is pressed and when the REJECT button 5105 is pressed will be described below.

Next, a processing flow of Authorization Code Grant based on OAuth 2.0 having characteristics of the present disclosure will be described with reference to FIG. 6. Like numbers refer to like parts in FIG. 1 and FIG. 6, and any repetitive detail descriptions will be omitted. The processing in S0.0, S0.1, S1.2, S2.0, and S2.2 in FIG. 1 may be replaced by processing in S3.0, S3.1, S4.0, S5.0, and S5.1, which will be described below, to execute a processing flow based on OAuth 2.0 according to this embodiment.

First, a flow for registering the client 400 to be performed as a prior operation for executing OAuth 2.0 will be described with reference to FIG. 6. According to this embodiment, the client 400 actively communicates with the authorization server 200 to execute a registration request for the client 400, for example. However, a user may access the authorization server 200 via the web browser to execute a registration request for the client 400. The flow for registering the client 400 starts upon start-up of the client 400 or if the client 400 has not been registered yet at the beginning of the authorization flow in S1.1.

The client 400 transmits a registration request for the client 400 to the authorization server 200 (S3.0). The authorization server 200 having received the registration request generates a client ID for identifying the client 400 and a key pair of an encryption key and a decryption key (or a public key and a private key) for authenticating the client 400. According to this embodiment, a private key and an encryption key will be exemplarily described below. The authorization server 200 returns the generated client ID and the private key as a registration response to the client 400 (S3.1). The client ID and the private key are saved in association with each other in the client 400 while the client ID and the public key are saved in association with each other in the authorization server 200. This embodiment will be described by assuming the client ID as "client_01". An example of association information held in the client 400 is illustrated in Table 1, and an example of association information held in the authorization server 200 is illustrated in Table 2.

TABLE 1

| CLIENT ID | PRIVATE KEY |
|---|---|
| client_01 | PRIVATE KEY A |

TABLE 2

| CLIENT ID | PUBLIC KEY |
|---|---|
| client_01 | PUBLIC KEY A |

The information to be transmitted to the client 400 as a registration response is not limited to the form as described above. For example, the client ID may be embedded as subject information of the private key, and only the private key may be transmitted to the client 400 as the registration response. Alternatively the authorization server 200 can generate a private key in advance, and the private key can be pre-installed in the client 400 while it is being manufactured, without executing the registration flow (S3.0 to S3.1) for the client 400. The registration flow for the client 400 has been described up to this point.

In the related art, a redirect URI and information regarding the client 400 are transmitted to the authorization server 200 during a prior registration of the client 400 (S0.0), and the transmitted information is managed in the authorization server 200. In contrast, a prior registration (S3.0) according to the present disclosure does not transmit the information and does not manage the transmitted information in the authorization server 200.

Next, with reference to FIG. 6, a processing flow will be described from a step in which a user logs in the client 400 to a step in which the client 400 transmits an authorization code request to the authorization server 200. A user logs in the client 400 (S1.0). It is assumed that the local user ID here is "local_user_01". The client 400 generates and holds a log-in context by which the local user ID can be identified. It may be configured such that the log-in context can become void in response to a log-out operation performed by a user or after an expiration date preset for the context.

Next, a user accesses a URI for starting an authorization of the client 400 via the web browser (S1.1). In a case where the user agent here is the web browser 410, a user can start the web browser 410 or can use a bookmark for the web browser 410 to access the URI. Alternatively, a user interface, not illustrated, of the client application 420 can be operated to start the web browser 410 to start the authorization processing. In a case where the user agent is the web browser 510, the web browser 410 can receive a remote access performed by the web browser 510, and the URI for the authorization start can be input for the access in the web browser 510, or a bookmark corresponding thereto can be used for the access. Alternatively, the client application 420 responds with a screen, not illustrated, to a remote access by the web browser 510, and a user can press a link to the URI for the authorization start embedded in the screen for the access.

If the client 400 in S1.1 receives the access to the authorization start URI, the client 400 transmits an authorization code request to an authorization end point of the authorization server 200 (S4.0). More specifically, a redirect instruction to the authorization end point of the authorization server 200 is transmitted to the web browser. The authorization code request transmitted in S4.0 includes information for designating an authorization code as a response type to the authorization code response and a state parameter for uniquely associating the authorization code request with the authorization code response.

The authorization code request transmitted in S4.0 further includes a JSON web Token (JWT). More specifically, client_assertion_type:jwt-bearer is declared in an OAuth 2.0 JWT Profile, and a JWT is set as a parameter for client_assertion. FIG. 7 illustrates an example of the authorization code request when a JWT is set as a parameter. A JWT includes a header part (starting from "Header"), a payload part (starting from "Payload"), and a digital signature part (starting from "Encoded"), all of which are encoded according to an encoding method denoted by Base 64.

In the payload part, a client ID "client_01" is set under "iss" (representing an issuer) and "sub" (representing a subject). A URI of an authorization end point of the authorization server 200 is set under "aud" (representing a user), and information is set under "exp" (representing an expiration date) and "iat" (representing an issued date and time). A client name is set under "client_name", and a description of the client 400 is set under "description". Referring to FIG. 7, "DEVICE XX" is set as a client name of the client 400, and "DEVICE XX\r\nLOCATED IN YY." is set as a description of the client 400. A redirect URI is set under "redirect_uri", and "https://192.168.1.1/redirect", for example, is set here. As necessary, information regarding an icon image is set under "icon_image" along with an image format of the icon image. The information to be set regarding the icon image can be a URI if the icon image exists or can be information for identifying the image if the image is held in the authorization server 200.

After these information pieces are set, character strings in the header part and the payload part are encoded according to Base64, and a digital signature is provided by using the private key held in the client 400 to the character strings. The authorization server 200 having obtained the JWT in S4.0 identifies a public key based on the client ID and verifies the digital signature included in the JWT by using the public key to authenticate the client 400 and verify that the character strings in the JWT are not altered. As a result, it is verified that the redirect URI included in the JWT of the authorization code request in S4.0 is set by the client 400 and is not altered.

Up to this point, the flow has been described from the step in which a user logs in the client 400 to the step in which the client 400 transmits an authorization code request to the authorization server 200. Based on the JWT, the redirect URI included in the authorization code request can be trusted. Therefore, the authorization server 200 may not compare it with a redirect URI and may not register a redirect URI with the authorization server 200 in advance. As a result, even when the URI of the client 400 is changed and the redirect URI is thus changed, the changed URI of the client 400 can be used to transmit the authorization code request to the authorization server 200.

The language to be used for writing information regarding the client 400 to be displayed on the authorization confirmation screen, such as a client name, a description, and an icon image can be determined based on language information regarding a language used by a local user, which is stored in the client 400, or language information set in an Accept-Language header on a web browser (language information included in a request from the web browser). This means that the information regarding the client 400 included in the authorization code request in S4.0 can be written based on the language information. Thus, the authorization server 200 can receive the information regarding the client 400 to present an authorization confirmation screen adapted for a local user who is logging in the client 400 to the user.

Next, with reference to FIG. 6, processing will be described from presenting the log-in screen to a user via the web browser to issuing an authorization code to the client 400. The authorization server 200 having received the authorization code request to the authorization end point presents the log-in screen if the user has not logged in the authorization server 200 (S1.3). FIG. 5A illustrates an example of the log-in screen. The user may input a user ID and a password on the log-in screen 5000 and press the LOG IN button 5003 to transmit an authentication request to the authorization server 200 (S1.4). The authorization server 200 having received the authentication request compares the combination of the user ID and the password with information registered in advance with the authorization server 200 and, if they match, issues an authorization token. The issued authorization token is returned to a Cookie of the web browser as a response. Here, the authorization token may be a random and unpredictable character string or may be an encrypted character string including identification information of the log-in user and a login date and time. In the former case, the authorization token is held in the authorization server 200 in combination with the identification information (or a user ID in this embodiment) of the log-in user. The user ID in this embodiment is assumed as "user_01" here.

The authorization server 200 responds with an authorization confirmation screen to the web browser (S1.5). FIG. 5B illustrates an example of the authorization confirmation screen. However, when the digital signature in the JWT received in the authorization code request in S4.0 is verified with the public key and if it is determined as invalid, an error screen, not illustrated, is returned, and the processing ends. The processing of the digital signature verification can prevent redirect to an invalid URI. A case where the digital signature in the JWT is valid will be described below.

The authorization confirmation screen 5100 is displayed on the web browser based on the values (client name 5101, the description 5102, and the icon image 5103) included in the JWT received in the authorization code request in S4.0. Here, if the user presses the REJECT button 5105 and if the combination of the client ID and the redirect URI matches the corresponding one registered in advance, the authorization server 200 adds information indicating that the user rejects the authorization of the client 400 to a query parameter in the redirect URI. The authorization server 200 then responses with an instruction to redirect the information to a response destination designated in the redirect URI to the web browser.

Use of such a JWT, as described above, enables rejection of an invalid authorization code request and can provide the web browser with a display screen indicating that the authorization code request has been rejected. Even if the request in S4.0 is not rejected, a user can reject the authorization through the authorization confirmation screen and transmit the information indicating that the authorization has been rejected to the web browser.

On the other hand, if the user presses the PERMIT button 5104, the authorization operation is executed (S1.6), and the authorization server 200 issues an authorization code. The authorization code issued in S1.6 and the state parameter received in the authorization code request in S4.0 are added as query parameters to the redirect URI, and an instruction to redirect the authorization code and state parameter to the response destination designated in the redirect URI is returned to the web browser (S1.7). The issued authorization code is saved in the authorization server 200 in association with the client ID, the user ID, and the redirect URI. The authorization code saved in the authorization server 200 may be used in the verification of the client 400 to be performed in response to a token request, which will be described below. Here, the authorization code is saved in association with the client ID "client_01", the user ID "user_01", and the redirect URI "https://192.168.1.1/redirect", for example. The authorization code is to be an unpredictable, random character string and may have an expiration date. The authorization server 200 determines that the authorization is approved by the user and registers approval information (the user ID and the client ID) as information regarding the log-in user.

The client 400 having received the authorization code response in S1.7 transmits a token request to a token end point of the authorization server 200 (S5.0). The token request includes a JWT (JSON web Token) including a definition "grant_type=authorization_code" indicating that the authorization flow is based on Authorization Code Grant and the obtained authorization code and client authentication information. More specifically, the JWT is set here as a parameter in client_assertion in client_assertion_type:jwt-bearer declared in an OAuth 2.0 JWT Profile. FIG. 8 illustrates an example of the token request expressed by the JWT. Any repetitive detail descriptions of the part overlapping the authorization code request in FIG. 7 will be omitted.

The authorization server 200 having received the token request in S5.0 verifies a signature in the JWT by using a public key identified from the client ID. If the verification succeeds and the client 400 is authenticated, the authorization server 200 issues an authorization token and transmits a token response to the client 400 (S2.1). The client 400 transmits a refresh request to a token end point of the authorization server 200 (S5.1). In S2.2, an authentication method for the client 400 in the refresh request performs the comparison based on a combination of a client ID and a secret to authenticate the client 400. On the other hand, in S5.1, a digital signature added to a client ID is verified by using a private key to authenticate the client 400. This processing presents the log-in screen on the web browser and then issues an authorization code to the client 400.

Figure 9:
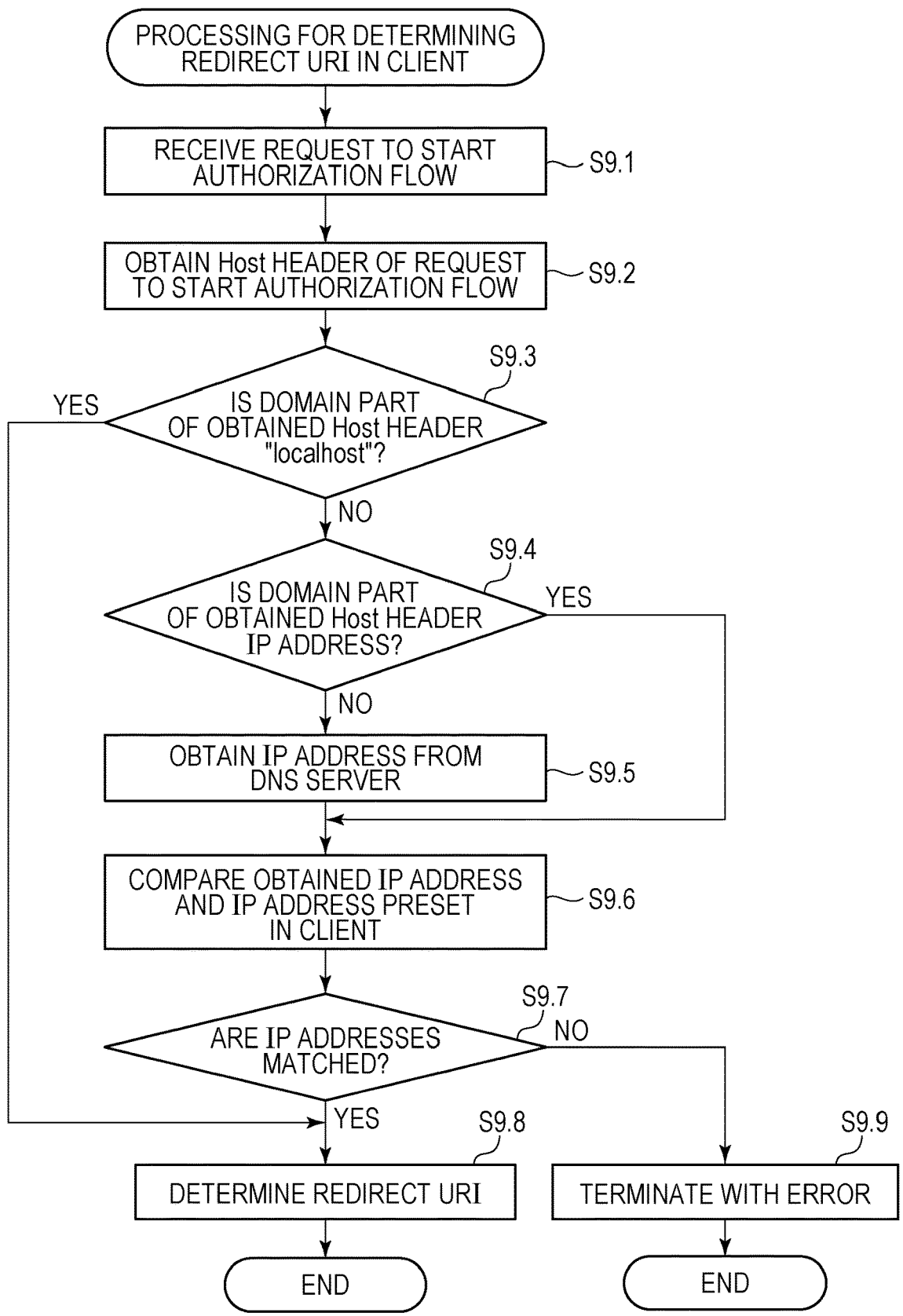
FIG. 9 illustrates a processing flow for determining a redirect URI in the client according to the embodiment.

Next, processing for determining a redirect URI to be set in the authorization code request will be described with reference to FIG. 9. The processing in FIG. 9 is a processing flow for determining a redirect URI in the client 400. This processing is started when the client 400 receives an initiation request (S1.1) for an authorization flow (S9.1). The client 400 obtains a Host header in the initiation request for the authorization flow (S9.2). The client 400 determines whether the domain part of the obtained Host header is "localhost" (S9.3). The domain part "localhost" corresponds to a host name indicating a device in which a program is to be executed and, in this case, indicates a web browser to which the initiation request for the authorization flow is transmitted. From the determination result in S9.3, the web browser to which the initiation request for the authorization flow is transmitted can be identified. It is assumed here that the web browser 410 transmits the initiation request for the authorization flow to the client 400. If the Host header is "localhost", it is determined that the domain part of the redirect URI is "localhost" (S9.8). For example, the redirect URI may be "https://localhost/redirect".

If the domain part of the Host header is not "localhost" in S9.3, the client 400 determines whether the domain part of the Host header is an IP address (S9.4). If not, the Host header obtained in S9.2 is used to make an inquiry to a DNS server, not illustrated, to obtain an IP address (S9.5). For example, in a case where the Host header is "www.canon.jp:443", a port number "443" is added to "www.canon.jp" that is a domain (Fully Qualified Domain Name: FQDN). In this case, the domain part as a part of the Host header is extracted, and an inquiry is made to the DNS server with the domain part. After an IP address is obtained, processing in S9.6, which will be described below, is executed.

If the domain part of the Host header is an IP address in S9.4, the IP address preset in the client 400 and the obtained IP address are compared in the client 400 (S9.6). Whether the IP addresses match or not is determined in the client 400 (S9.7). If the IP addresses do not match, it is determined that the access received in S9.1 is invalid, and the processing terminates with error (S9.9). If the IP addresses match, it is determined that the access received in S9.1 is valid, and a URI having the domain part of the Host header obtained in S9.2 is generated. The generated URI is determined as a redirect URI (S9.8). The method for determining a redirect URI in the client 400 has been described up to this point. According to the method, a redirect URI can be determined in response to an initiation request for the authorization flow in the processing flow based on OAuth 2.0 even when the IP address or the host name is changed.

This embodiment can eliminate the necessity for prior registration and management of a redirect URI and information regarding a client to be presented on the authorization confirmation screen without impairing security in the processing flow of Authorization Code Grant based on OAuth 2.0 and can easily address dynamic changes.

Other Embodiments

A scope parameter which indicates a scope of authorization can be designated in an authorization code request. For example, the scope parameter designated in an authorization code request can be managed in association with an authorization code, an authorization token, and a refresh token. The scope of authorization indicated by the scope parameter can be displayed in the displayed authorization confirmation screen 5100.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2017-167285 filed Aug. 31, 2017, which is hereby incorporated by reference herein in its entirety.

What is claimed is:

1. An authority transfer system including a client, a user agent apparatus, and an authorization server, the client, comprising:
  one or more processors; and
  at least one memory coupled to the one or more processors and having stored thereon instructions,
  which when executed by the one or more processors, cause the client to:
  transmit a client registration request not including information about a redirect uniform resource identifier (URI) of the client to register the client as an authorized client;
  generate an authorization code request in accordance with reception of an authorization start instruction;
  wherein the authorization code request includes an encrypted parameter encrypted using key information that is a response to the client registration request and the redirect URI of the client, and
  wherein the redirect URI included in the authorization code request is a redirect URI determined when an authentication flow is executed; and
  transmit, to the authorization server via the user agent apparatus, the authorization code request that is a request for acquiring an authorization code that is a code indicating that permission has been granted by a user via the user agent apparatus for the client to access resources of a resource server;
  the user agent apparatus comprising:
  one or more processors; and
  at least one memory coupled to the one or more processors of the user agent apparatus and having stored thereon instructions,
  which when executed by the one or more processors of the user agent apparatus, cause the user agent apparatus to receive a user operation for authorizing the access via an authorization confirmation screen for authorizing the access;

the authorization server comprising:

one or more processors; and at least one memory coupled to the one or more processors of the authorization server and having stored thereon instructions, which when executed by the one or more processors of the authorization server, cause the authorization server to:

transmit the authorization confirmation screen data to the user agent apparatus in a case where decryption of the encrypted parameter included in the received authorization code request is attempted using the key information issued when the client is registered as the authenticated client and the decryption succeeds; and in response to the user operation received via the authorization confirmation screen, transmit the authorization code response, which is a response to the authorization code request, to the client via the user agent apparatus, based on the URI included in the authorization code request;

the client comprising:

receive the authorization code response.

2. The authority transfer system according to claim 1, wherein the signature information is added to the URI by using a private key held by the client, and wherein the authorization server is configured to verify the signature information added to the URI by using a private key held by the authorization server.

3. The authority transfer system according to claim 2, wherein, after receiving the client registration request from the client to register information regarding the client with the authorization server, the authorization server is configured to generate client identification information for identifying the client and a public key and the private key for authenticating the client, and to manage the client identification information and the public key in association with each other, wherein the authorization server is configured to transmit the client identification information and the private key to the client as a response to the client registration request.

4. The authority transfer system according to claim 3, wherein the authorization server is configured to identify, having received the authorization code request, the public key for verifying the signature information based on the client identification information received along with the authorization code request.

5. The authority transfer system according to claim 1, wherein the user agent apparatus comprises a display unit configured to display an authorization confirmation window usable by a user for approving to authorize an access to the resource server by the client, wherein the authorization code request includes information regarding the client to be presented on the authorization confirmation window displayed by the display unit and language information designating a language to be used for presentation of the information regarding the client.

6. The authority transfer system according to claim 5, wherein the language information is one of language information preset in the client and language information included in a request from the user agent apparatus.

7. The authority transfer system according to claim 1, wherein the URI is a redirect URI designating a response destination of the authorization code response usable by the client for receiving the authorization code response from the authorization server.

8. The authority transfer system according to claim 7, wherein the redirect URI is determined based on a Host header of the user agent apparatus including a request to start authorization processing for authorizing the access by the authorization server, and wherein, in a case where the redirect URI is not determined based on the Host header, the client is configured to obtain a new IP address, and the redirect URI is determined based on the obtained IP address.

9. The authority transfer system according to claim 4, wherein the information regarding the client includes a client name or a description regarding the client.

10. A control method for an authority transfer system, the method comprising:

transmitting a client registration request not including information about a redirect uniform resource identifier (URI) of the client to register the client as an authorized client;

generating an authorization code request in accordance with reception of an authorization start instruction;

wherein the authorization code request includes an encrypted parameter encrypted using key information that is a response to the client registration request and the redirect URI of the client, and wherein the redirect URI included in the authorization code request is a redirect URI determined when an authentication flow is executed; and transmitting to an authorization server via a user agent apparatus, the authorization code request that is a request for acquiring an authorization code that is a code indicating that permission has been granted by a user via the user agent apparatus for a client to access resources of a resource server;

receiving a user operation for authorizing the access via an authorization confirmation screen for authorizing the access;

transmitting the authorization confirmation screen data to the user agent apparatus in a case where decryption of the encrypted parameter included in the received authorization code request is attempted using the key information issued when the client is registered as the authenticated client and the decryption succeeds;

in response to the user operation received via the authorization confirmation screen, transmit the authorization code response, which is a response to the authorization code request, to the client via the user agent apparatus, based on the URI included in the authorization code request; and receiving the authorization code response.

11. A non-transitory storage medium storing a computer program comprising instructions which, when the program is executed by a computer, cause the computer to carry out a control method for an authority transfer system, the method comprising:

transmitting a client registration request not including information about a redirect uniform resource identifier (URI) of the client to register the client as an authorized client;

generating an authorization code request in accordance with reception of an authorization start instruction;

wherein the authorization code request includes an encrypted parameter encrypted using key information that is a response to the client registration request and the redirect URI of the client, and wherein the redirect URI included in the authorization code request is a redirect URI determined when an authentication flow is executed; and transmitting to an authorization server via a user agent apparatus, the authorization code request that is a request for acquiring an authorization code that is a code indicating that permission has been granted by a user via the user agent apparatus for a client to access resources of a resource server;

receiving a user operation for authorizing the access via an authorization confirmation screen for authorizing the access;

transmitting the authorization confirmation screen data to the user agent apparatus in a case where decryption of the encrypted parameter included in the received authorization code request is attempted using the key information issued when the client is registered as the authenticated client and the decryption succeeds;

in response to the user operation received via the authorization confirmation screen, transmit the authorization code response, which is a response to the authorization code request, to the client via the user agent apparatus, based on the URI included in the authorization code request; and receiving the authorization code response.

* * * * *